May 6, 1952  E. W. BOTTUM  2,595,445
DEHYDRATOR STRUCTURE
Filed Dec. 23, 1946
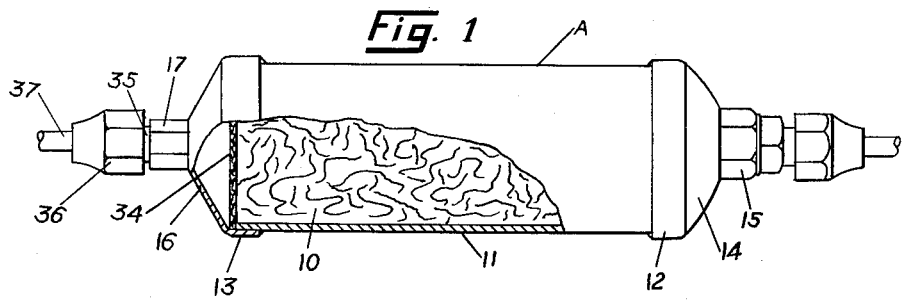
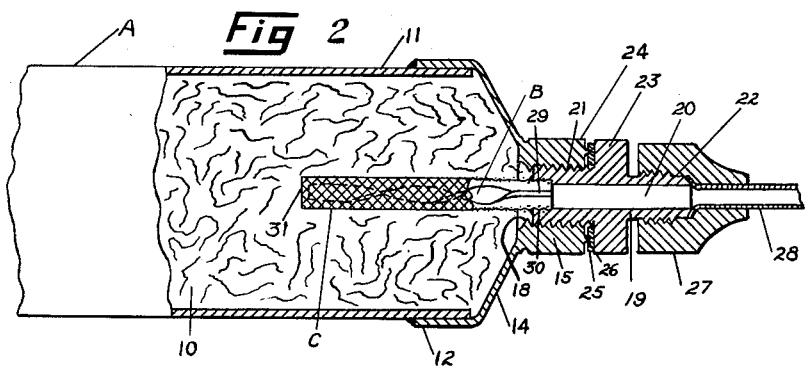
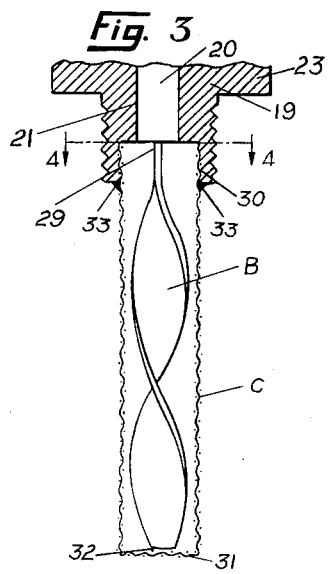
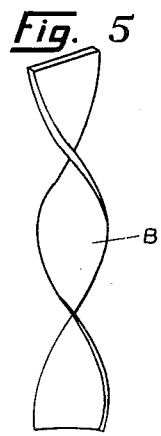
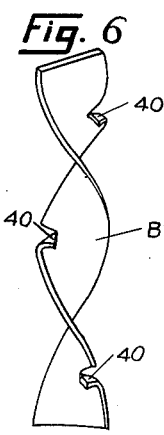
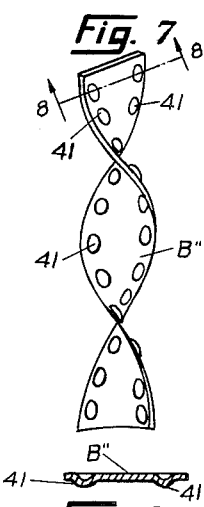
INVENTOR.
EDWARD W. BOTTUM
BY
ATTORNEYS Patented May 6, 1952

2,595,445

UNITED STATES PATENT OFFICE 2,595,445

DEHYDRATOR STRUCTURE

Edward W. Bottum, Detroit, Mich.

Application December 23, 1946, Serial No. 718,008

2 Claims. (Cl. 210—131)

The invention relates generally to dehydrators and refers more particularly to a refillable dehydrator structure for use with refrigerating apparatus.

One of the essential objects of the invention is to provide a structure of the type mentioned wherein means is provided at the inlet end of an elongated casing containing silica gel for creating at said inlet the maximum turbulence of a refrigerating medium supplied thereto so that such medium will be distributed throughout substantially the entire content of the silica gel within said casing before being discharged therefrom at the outlet end thereof. Thus, channeling of the medium longitudinally through the casing is effectively eliminated, and more efficient dehydration is obtained.

Another object is to provide a dehydrator structure wherein the distributing means aforesaid is preferably within and is maintained in screened relation to the silica gel by a foraminous enclosure through which the medium may be distributed as set forth. Thus, such distributing means is free of the silica gel and is unhampered to deflect and diffuse the medium as desired.

Another object is to provide a dehydrator structure wherein the construction and arrangement of the distributing means and foraminous enclosure is such that dirt supplied to the inlet by the medium will accumulate within the foraminous enclosure at the closed end thereof remote to the inlet so that the remainder of said enclosure will be free of dirt and the flow of such medium through said remainder of the enclosure to and through the silica gel will be free and unobstructed by dirt.

Another object is to provide a dehydrator wherein the distributing means and foraminous enclosure therefor are carried by and preferably project endwise from a removable fitting at the inlet end of the casing, whereby the fitting, distributing means and enclosure as a unit may be easily removed from the casing for any purpose, for example to clean the enclosure or to refill the casing with silica gel.

Another object is to provide a dehydrator structure that is simple in construction, economical to manufacture, easy to install and efficient in operation.

Other objects, advantages and novel details of construction of this invention will be made more apparent as this description proceeds, especially when considered in connection with the accompanying drawing, wherein:

Fig. 1 is an elevational view of a dehydrator structure embodying my invention with parts adjacent the outlet end thereof broken away and in section;

Fig. 2 is an enlarged fragmentary elevation of the dehydrator structure with parts at the inlet end thereof broken away and in section;

Fig. 3 is a longitudinal vertical sectional view through the tubular screen and through a portion of the inlet fitting, and showing the spiral strip within said screen;

Fig. 4 is a sectional view taken on the line 4—4 of Fig. 3;

Fig. 5 is a detail view of the spiral strip illustrated in Fig. 3;

Fig. 6 is a view similar to Fig. 5, but showing a slight modification;

Fig. 7 is a view similar to Fig. 5, but showing another modification; and

Fig. 8 is a sectional view taken on the line 8—8 of Fig. 7.

Referring now to the drawing, A is the elongated casing containing silica gel 10, B is the distributing means for the refrigerating medium, and C is the foraminous enclosure or screen for said distributing means.

As shown, the casing A has a tubular body 11 provided at opposite ends thereof with caps 12 and 13 respectively. Such casing and caps may be formed of any suitable material such as brass and are preferably rigidly and permanently secured together. The cap 12 has a substantially frusto-conical portion 14 provided axially of the casing with an interiorly threaded polygonal inlet nipple 15 which projects endwise from and constitutes the inlet for the casing. Likewise, the cap 13 has a substantially frusto-conical portion 16 provided axially of the casing with an interiorly threaded polygonal outlet nipple 17 which projects endwise from and constitutes the outlet for the casing.

Threadedly engaging the interiorly threaded portion 18 of the inlet of the casing is a removable fitting 19 having an axially extending passage 20 for a refrigerating medium. Opposite end portions 21 and 22 respectively of said fitting are exteriorly threaded, while intermediate said end portions is an integral polygonal portion 23 which extends laterally outward in substantially parallel relation to the flat outer end 24 of the inlet nipple 15. Located between this polygonal portion 23 and the end 24 of the inlet nipple 15 is a gasket 25 of suitable material, and formed integral with the outer end of said nipple is an annular rib or ridge 26 for biting engagement with said gasket 25 to form a fluid-tight seal.

On the outer end portion 22 of said fitting is threaded a clamping nut 27 for a length 28 of tubing through which the refrigerating medium is conducted to the casing from a suitable source (not shown) of a refrigerating apparatus.

The distributing means B for the refrigerating medium is carried by and extends endwise from the inner end portion 21 of the fitting 19. Preferably this means B is located axially of the fitting 19 and is in the form of a spiral strip of sheet metal. If desired, an end portion 29 of the spiral strip may extend within the inner end portion 21 of the fitting, as illustrated in Fig. 2.

The foraminous enclosure C encircles the spiral strip B throughout its length and has an open end 30 and a closed end 31. The open end 30 of said enclosure fits within and is preferably soldered around its periphery to the inner end portion 21 of the fitting 19, while the closed end 31 of said enclosure is adjacent and extends across the end 32 of the spiral strip B that is remote to the fitting 19. Actually this construction and arrangement alone of the enclosure C relative to the fitting 19 is sufficient to hold the spiral strip B in proper position relative to said fitting, hence separate or additional holding or securing means for said spiral strip are unnecessary. As a result, the spiral strip B may be loose relative to the fitting 19, however, it is preferably anchored thereto by some of the solder 33 employed to secure the foraminous enclosure C to said fitting. Such solder would adhere to opposite side edges of the spiral strip B.

At the outer end of the casing A, preferably between the tubular body 11 and frusto-conical portion 16 of the cap 13, is a porous bronze filter 34 which serves as a partition for the casing A and as a final trap for any fine particles of dirt or silica gel.

A fitting 35 threadedly engages the outlet nipple 17 of the casing and has an axially extending passage (not shown) for the dehydrated refrigerating medium. Threadedly engaging the outer end portion of this fitting 35 is a clamping nut 36 for a length 37 of tubing through which the dehydrated refrigerating medium is conducted from the casing A to another part (not shown) of the refrigerating apparatus.

In use, the spiral strip B will create at the inlet 15 of the casing sufficient turbulence of the refrigerating medium supplied thereto so that said medium will be deflected through the foraminous enclosure C for distribution throughout substantially the entire content of the silica gel within the casing before being discharged therefrom at the outlet end thereof. Thus, channeling of the medium longitudinally through the casing is effectively eliminated and more efficient dehydration is obtained. Inasmuch as the spiral strip B is within and is screened from the silica gel by the foraminous enclosure C, it is apparent that such spiral strip is unhampered and can effect better the distribution of the refrigerating medium through the silica gel. If any dirt is supplied to the inlet 15 by the refrigerating medium, such dirt will be trapped within the foraminous enclosure C at the closed end 31 thereof remote to the inlet 15, hence the remainder of said enclosure C will be free of dirt and the flow of such medium through the remainder of the enclosure to and through the silica gel will be free of and unobstructed by dirt. The filter 34 acts as a final trap for any fine particles of dirt or silica gel, hence the refrigerating medium discharged through the outlet nipple 17 of the casing will not only be properly dehydrated but will be free of dirt and extraneous particles.

When it is desired to clean the foraminous enclosure C or to refill the casing A with silica gel or the like, the fitting 19, enclosure C and strip B as a unit may be readily removed from the inlet 15 by simply unscrewing the end portion 21 of said fitting from the polygonal nipple 15.

In Fig. 6 I have illustrated a slight modification wherein the spiral strip B' has at opposite side edges thereof struck-out portions 40 that are engaged by and cause greater turbulence of the refrigerating medium. Thus, the distribution of the refrigerating medium through the silica gel is more effective.

In Figs. 7 and 8 I have illustrated another modification wherein the spiral strip B'' is provided adjacent opposite side edges thereof with longitudinally spaced embossed portions 41 that are engaged by and cause greater turbulence of the refrigerating medium so that the distribution thereof through the silica gel will be more effective.

Various other modifications could be shown, but it should be apparent from the disclosures in Figs. 6 to 8 inclusive that almost any deformation of the spiral strip, especially at opposite side edges thereof, will increase the turbulence of the refrigerating medium and thus will enhance and improve its distribution throughout the silica gel. Likewise, it is apparent that any suitable absorbent substance other than silica gel may be used within the casing A. However, in each instance the silica gel or other substance would be used in sufficient quantities to substantially fill the interior of the casing.

What I claim as my invention is:

1. Refrigerating apparatus comprising a dehydrator located in the refrigerant circulating system, said dehydrator comprising an elongated casing having inlet and outlet openings at opposite ends thereof, an elongated tubular foraminous member disposed axially within said casing, said member having an open end in communication with said inlet opening and a closed end of foraminous material opposite its open end, the length of said member being substantially less than the length of said casing so that the closed end of said member is spaced substantially from the outlet end of said casing, the diameter of said member being substantially less than the diameter of said casing so that the sides of said member are spaced substantially from the sides of said casing, a helically twisted flat deflector strip in said member having a width substantially equal to the diameter of said member and extending substantially from end to end thereof, the deflector strip having concave-convex embossments disposed along the edge thereof to break up smooth flow of fluid along said strip to thereby increase lateral deflection of fluid, the interior of said member being free of obstructions other than said deflector strip to provide for free flow of refrigerant in a helical path providing for centrifugal deflection of some refrigerant laterally of said member, the entire space between the interior of said casing and the exterior of said member being filled with a moisture absorbing material.

2. Refrigerating apparatus comprising a dehydrator located in the refrigerant circulating system, said dehydrator comprising an elongated casing having inlet and outlet openings at opposite ends thereof, an elongated tubular foraminous member disposed axially within said casing, said member having an open end in communication with said inlet opening and a closed end of foraminous material opposite its open end, the length of said member being substantially less than the length of said casing so that the closed end of said member is spaced substantially from the outlet end of said casing, the diameter of said member being substantially less than the diameter of said casing so that the sides of said member are spaced substantially from the sides of said casing, a helically twisted flat deflector strip in said member having a width substantially equal to the diameter of said member and extending substantially from end to end thereof, said deflector strip having tongue portions struck out of the edges thereof to break up smooth flow of fluid along said strip to increase lateral deflection of fluid, the interior of said member being free of obstructions other than said deflector strip to provide for free flow of refrigerant in a helical path providing for centrifugal deflection of some refrigerant laterally of said member, the entire space between the interior of said casing and the exterior of said member being filled with a moisture absorbing material.

EDWARD W. BOTTUM.

REFERENCES CITED

The following references are of record in the file of this patent:

UNITED STATES PATENTS

| Number | Name | Date |
|---|---|---|
| 365,114 | Wilson | June 21, 1887 |
| 1,048,828 | Haas | Dec. 31, 1912 |
| 1,246,583 | Fulweiler | Nov. 13, 1917 |
| 1,609,867 | Eisenhauer | Dec. 7, 1926 |
| 1,758,881 | Birkholz | May 13, 1930 |
| 1,866,659 | Little, Jr. | July 12, 1932 |
| 2,048,871 | Knecht | July 28, 1936 |
| 2,104,519 | Hurn | Jan. 4, 1938 |
| 2,117,091 | Gudmundsen | May 10, 1938 |
| 2,147,671 | Pratt | Feb. 21, 1939 |
| 2,225,990 | Henry | Dec. 24, 1940 |
| 2,365,149 | Anderson | Dec. 19, 1944 |

FOREIGN PATENTS

| Number | Country | Date |
|---|---|---|
| 100,667 | Australia | Mar. 30, 1937 |